United States Patent [19]

Yamamoto et al.

[11] Patent Number: 5,698,313
[45] Date of Patent: Dec. 16, 1997

[54] MAGNETIC RECORDING MEDIUM

[75] Inventors: Naoto Yamamoto; Tsutomu Kenpo, both of Hino, Japan

[73] Assignee: Konica Corporation, Tokyo, Japan

[21] Appl. No.: 173,196

[22] Filed: Dec. 23, 1993

[30] Foreign Application Priority Data

Jan. 22, 1993 [JP] Japan ................... 5-009275

[51] Int. Cl.$^6$ ................... G11B 5/66; G11B 6/70
[52] U.S. Cl. ............. 428/336; 428/694 B; 428/694 BU; 428/694 BS; 428/694 BG; 428/694 BY; 428/694 BN; 428/694 SL; 428/694 BA; 428/900; 428/928
[58] Field of Search ................... 428/694 B, 694 BA, 428/694 BU, 694 BS, 694 BG, 694 BN, 336, 900, 928, 694 SL, 694 BY

[56] References Cited

U.S. PATENT DOCUMENTS

| | | | |
|---|---|---|---|
| 4,058,646 | 11/1977 | Vaeth et al. | 428/425 |
| 5,051,287 | 9/1991 | Yamada et al. | 428/64 |
| 5,089,317 | 2/1992 | Noguchi et al. | 428/212 |
| 5,258,223 | 11/1993 | Inaba et al. | 428/323 |

*Primary Examiner*—Paul J. Thibodeau
*Assistant Examiner*—Stephen Sand
*Attorney, Agent, or Firm*—Frishauf, Holtz, Goodman, Langer & Chick, P.C.

[57] ABSTRACT

Disclosed is a magnetic recording medium comprising a nonmagnetic base support and a magnetic layer containing ferromagnetic metallic powder dispersed in a binder, wherein the strain dependability of said magnetic recording medium is characterized in that: a ratio $G'_2/G'_1$ is not less than 0.01, wherein $G'_1$ is a storage modulus provided that the strain is $10^{-4}$, and $G'_2$ is a storage modulus provided that the strain is $10^{-2}$.

16 Claims, 2 Drawing Sheets

MAGNETIC RECORDING MEDIUM

FIELD OF THE INVENTION

The present invention relates to a magnetic recording medium, and more particularly relates to the regulation of dynamic visco-elasticity of the magnetic recording medium.

BACKGROUND OF THE INVENTION

Requirements for a magnetic recording medium which is useful used as a recording and reproducing element in an information processing apparatus, are described below The electromagnetic transforming properties are appropriate and precise. Excellent traveling properties and durability can be guaranteed. Especially, it is necessary that these properties are maintained well-balanced.

Recently, there is a great demand for high density recording capability for magnetic recording medium. Therefore, it is necessary to reduce the size of ferromagnetic particles, and it is also necessary to load the ferromagnetic particles at high density. Further, it is necessary to uniformly disperse the ferromagnetic particles in a binder in the magnetic layer. Furthermore, it is necessary to make the surface of the magnetic layer more smooth in order to reduce the spacing loss of the magnetic recording medium.

Unless the size of ferromagnetic particles is reduced, the following problems may be encountered: The dispersion properties of the particles are lowered. As a result of the deterioration of the dispersion properties, the magnetizing properties are lowered. Further, the angular ratio is deteriorated As a result, the output is lowered.

Unless the surface of the magnetic layer is made smooth, the friction coefficient of the traveling system is increased, and the mechanical strength is lowered.

SUMMARY OF THE INVENTION

The present invention contemplates to overcome the foregoing disadvantages.

It is an object of the present invention to provide a magnetic recording medium, the ferromagnetic powder of which has high dispersion properties, and further the electromagnetic transducing properties and traveling durability of the magnetic recording medium are high.

DETAILED DESCRIPTION OF THE INVENTION

Figure 1:
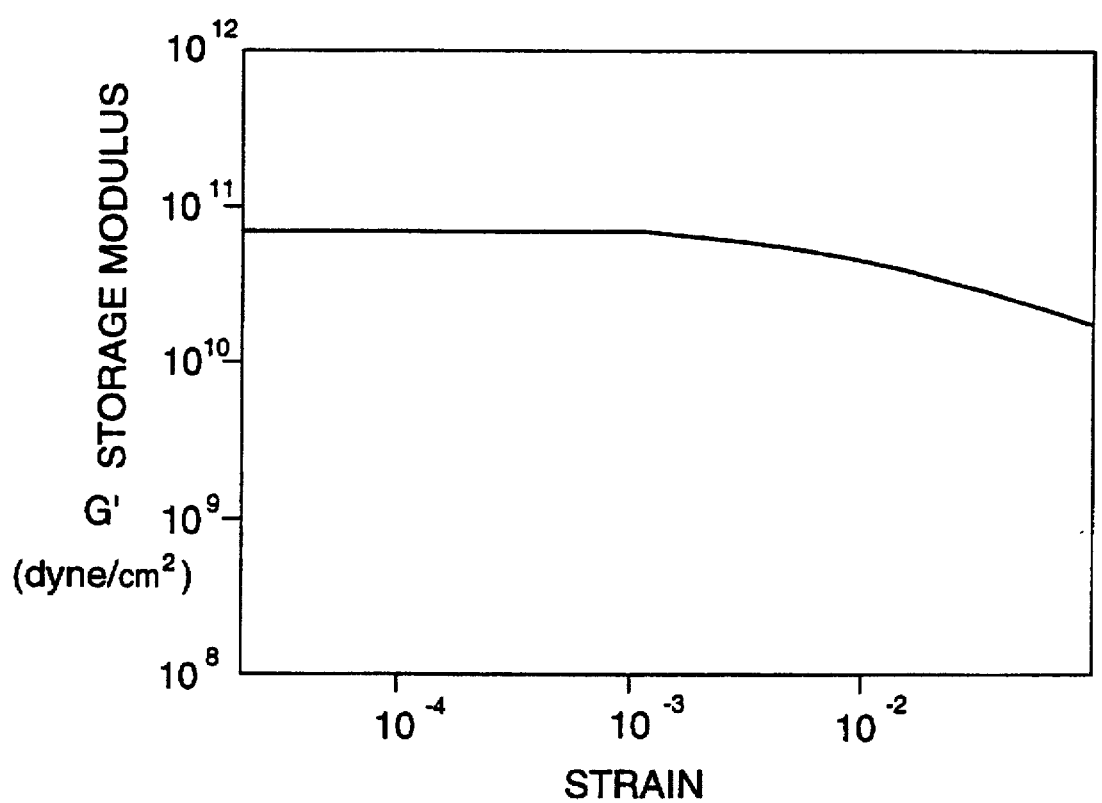
FIG. 1 is a graph showing a relation between the storage modules G' and the strain.

The magnetic recording medium discussed in this specification is mainly composed of magnetic powder and high molecular weight binder. Therefore, the dynamic properties of the magnetic recording medium are strongly influenced by the properties of the magnetic powder and binder. There is a close relation between the dynamic properties of the magnetic recording medium and the dispersion properties of ferromagnetic powder and binder, and the relation is closely related to the electromagnetic properties and traveling durability of the magnetic recording medium.

The characteristics of both magnetic powder and binder are determined by a number of factors.

One of the dynamic characteristics is the durability with respect to the deformation given to the magnetic recording medium while it is traveling.

That is, the strain repeatedly given to the magnetic recording medium by the traveling and conveying systems damages the inner structure provided in the magnetic layer, so that the basic performance of the magnetic recording medium itself is deteriorated.

For example, in the case of an inner structure in which there is a large difference between the elastic modulus under the condition of a minute deformation distortion and that under the condition of a large deformation distortion, the dispersion properties of magnetic powder in binder of the magnetic layer is low, so that the number of stress concentration is increased in accordance with the nonuniform structure in the magnetic layer. Consequently, structural breakdown tends to occur.

On the contrary, in the case of an inner structure in which there is a small difference between the elastic modulus under the condition of a minute deformation distortion and that under the condition of a large deformation strain, the dispersion properties of magnetic powder in binder of the magnetic layer is high, so that a uniform structure is provided in the magnetic layer. Therefore, even under the condition of a large strain the magnetic recording medium is less susceptible to mechanical breakdown, so that the dispersion properties of magnetic powder in binder is high, and the durability of a magnetic coated film is also high.

In this case, the strain $10^{-4}$ corresponds to a deformation strain caused by the friction between the magnetic tape and a head of the VTR. Also, the strain $10^{-2}$ corresponds to a deformation distortion generated by winding or rewinding of the magnetic tape. Concerning the magnetic recording tape used in the VTR, the durability can be evaluated when the elastic moduli of both the above-noted strains are compared with each other.

Further, the strain will be specifically explained as follows.

(1) The strain $10^{-4}$ is defined as a dynamic strain of 0.01% given to a test piece in its longitudinal direction, the frequency of which is constant (in this case, the frequency is 100 rad/s). In the same manner, the strain $10^{-2}$ is defined as a dynamic strain of 1% given to a test piece in its longitudinal direction, the frequency of which is constant.

(2) The strain is defined as follows:

$$\gamma = \frac{L - L_0}{L_0} = \frac{\Delta L}{L_0}$$

where $L_0$ is an original length of the test piece, and L is a length of the test piece after it has been elongated.

Also, a component to relax the stress generated in the magnetic layer is one of the conditions to satisfy the dynamic characteristics.

Unless a component to relax the stress generated in the magnetic layer is sufficiently concentrated on the inner structure in the traveling and conveying systems, the amount of stress concentration is increased, so that the structural breakdown tends to occur, and the durability of the magnetic recording medium deteriorates. As a result, the basic performance is lowered.

In the case where the relaxation modulus is rapidly lowered, the ratio of the viscous component is high, or the dispersion properties of magnetic powder and the degree of cross linking are low, so that the durability of traveling tends to be deteriorated. On the contrary, in the case where the relaxation modulus is slowly lowered, an amount of the relaxation component in the inner structure is large, so that the magnetic recording medium is excellent in fatigue characteristics, and the durability of traveling is good.

As described above, there is a correlation between the stress relaxation properties and the fatigue properties of a magnetic coated film, and also there is a correlation between the stress relaxation properties and the durability of traveling. Accordingly, when the modulus immediately after a deformation has been given and that after 100 seconds have passed after the deformation are compared, the mechanical strength of the magnetic tape can be evaluated.

The present invention has been achieved while consideration is given to the above conditions. According to the present invention, when the stress relaxation characteristics are adjusted, the durability of traveling of the magnetic recording medium can be improved.

In general, in the field of linear visco-elasticity, the moduli (G*, G' and G") depend only on each frequency of oscillation. However, in the case where the impressed distortion is increased and the inner structure is damaged, the stress is lowered, so that the modulus of storage G' is lowered.

In order to make the deterioration of modulus correspond to the durability of the magnetic recording medium, the strain dependability was measured.

The modulus of storage G' relating to the present invention is described as follows. In general, the dynamic modulus, and moduli measured by other methods are identified as one of the most basic dynamic features. Therefore, a dynamic experiment was employed as an index to express the dynamic features of the magnetic recording medium.

The result can be expressed by a complex modulus G* as follows.

$$G^* = G' + iG''$$

In this case, G' is a real number portion, which is referred to as an storage modulus, and G" is an imaginary number portion, which is referred to as a loss modulus.

A specific measuring method will be described as follows. A measuring apparatus RSA-II manufactured by Rheometrics Co. was used. In this experiment, a magnetic recording medium composed of a PET film and a magnetic layer coated on it was used as a sample. When the impressed strain was changed at a predetermined frequency, measurement was performed. That is, a strain the frequency of which was a predetermined value, was impressed in a longitudinal direction of the magnetic recording medium, and G' was observed when the impressed strain was increased. The measurement conditions of this experiment are described hereinbelow.

Frequency: 100 rad/s

Temperature: 0° to 40° C.

Size of the sample: Length is 23 mm and the width is 2 mm.

Strain: $2 \times 10^{-5}$ to $2 \times 10^{-2}$

The above measured value are expressed on a graph which is shown in FIG. 1. As illustrated in FIG. 1, when the strain impressed upon the sample is gradually increased, the modulus G' is lowered at a certain value of strain.

In the present invention, the storage modulus G' is found in this manner, and a ratio $G'_2/G'_1$ is required to be not less than 0.01, wherein the modulus of storage is $G'_2$ in the case where the impressed strain is $10^{-2}$, and the storage modulus is $G'_1$ in the case where the impressed strain is $10^{-4}$.

Due to the foregoing, the structure of the coated film is less susceptible to damage even when a large strain is impressed, and the storage modulus is not lowered, so that the durability of traveling of the magnetic recording medium can be improved.

In the present invention, it is necessary that the ratio $G'_2/G'_1$ is not less than 0.01, wherein the storage modulus is $G'_2$ in the case where the impressed strain is $10^{-2}$, and the storage modulus of storage is $G'_1$ in the case where the impressed distortion is $10^{-4}$. Preferably, the ratio $G'_2/G'_1$ is not less than 0.03.

In the case where the ratio $G'_2/G'_1$ is lower than 0.01, the inner structure tends to be damaged, so that the durability of traveling can not be improved.

In this case, the modulus Er is a time function in the case where a sample was instantaneously elongated and held at a predetermined length. The magnetic recording medium composed of a PET and a magnetic layer coated on it was used as a sample, and RSA-II manufactured by Rheometrics Co. was used as a measuring apparatus. In this case, the measuring conditions were described hereinbelow.

Temperature: 20° C.

Size of the sample: Length is 23 mm and width is 2 mm.

Strain: 0.001

Figure 2:
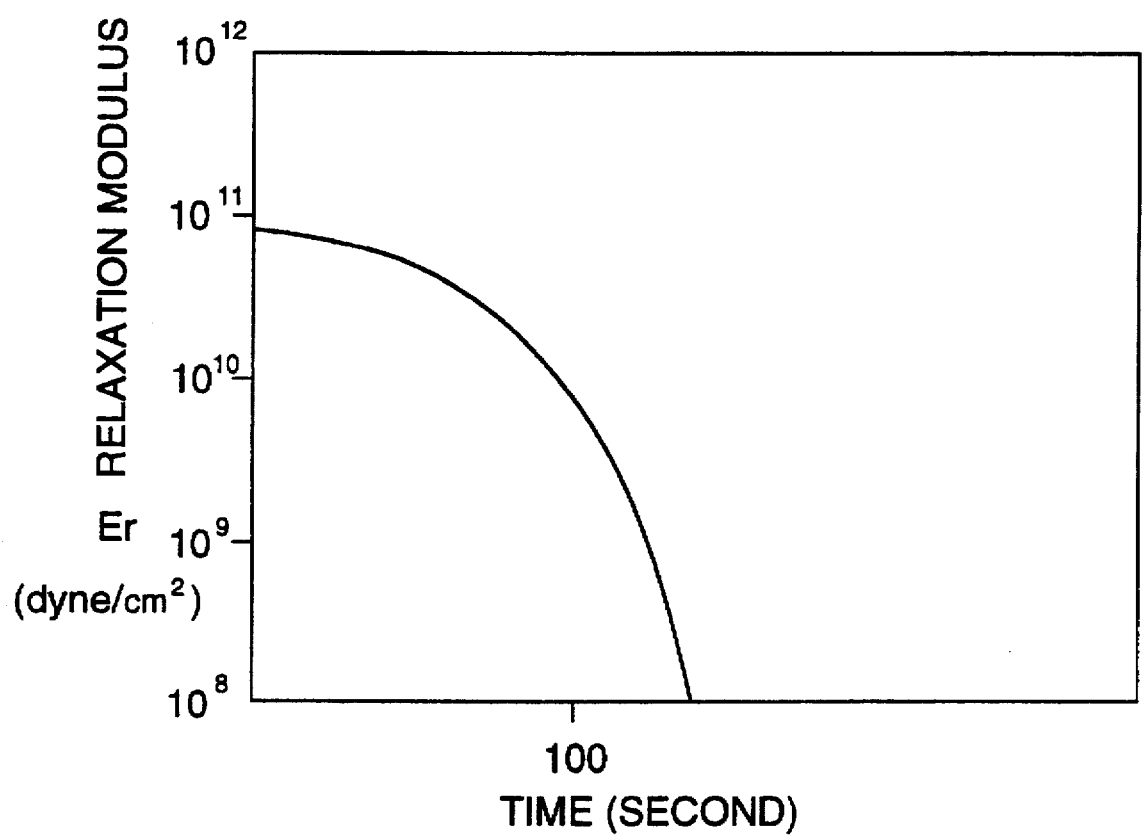
FIG. 2 is a graph showing a relation between the Relaxation modulus Er and the time that has lapsed away.

The measured values are expressed on a graph shown in FIG. 2. When a load was impressed upon the sample so as to as to be elongated at a predetermined length, the modulus was lowered as the time passed.

In the present invention, the modulus of a coated film was found in the aforementioned manner. A ratio $Er_2/Er_1$ is required to be not less than 0.1, wherein the modulus is $Er_1$ at a point of time of 0 second, and the modulus is $Er_2$ after 100 seconds have passed.

Due to the foregoing, the coated film is less susceptible to an abrupt deformation when a load is impressed. Therefore, the durability can be improved, and the inner structure of the coated film becomes uniform, and further the dispersion properties of ferromagnetic powder and binder can be improved.

When the ratio $Er_2/Er_1$ is lower than 0.1, the coated film is not provided with a sufficient relaxation mechanism, so that it tends to be damaged. As a result, the durability of traveling and the dispersion properties of ferromagnetic powder in the magnetic layer are deteriorated.

In order to improve the electromagnetic transforming properties, it is required to smooth a surface of the magnetic layer. Accordingly, when a nonmagnetic layer is provided coming into contact with the nonmagnetic base support, nonmagnetic powder having no magnetic attraction force can be easily dispersed. For this reason, the surface of the nonmagnetic layer is made more smooth, so that the surface of a magnetic layer provided on the nonmagnetic layer can be made more smooth. From the viewpoint of recording, it is advantageous to provide a thin magnetic layer, because the orientation properties can be improved and further signals are recorded on a surface layer.

The structure of the magnetic layer and nonmagnetic base support of the magnetic recording medium of the present invention will be described in detail as follows.

The magnetic recording medium of the present invention includes a magnetic layer in which ferromagnetic powder is dispersed in a binder, and a nonmagnetic base support, wherein the magnetic layer is coated on the base support.

Examples of usable ferromagnetic metallic powder used for the present invention are: metallic powder of Fe—Al, metallic powder of Fe—Ni, and ferromagnetic powder described on page 4 of Japanese Patent Publication Open to Public Inspection No. 113820/1991. Ferromagnetic powders disclosed in JP 113820/1991 include fine ferromagnetic metal powder such as Co-containing $\gamma\text{-Fe}_2O_3$ powder, Co-containing $Fe_3O_4$ powder, Co-containing $FeO_x$ ($4/3 < x < 3/2$) powder, Fe—Al metal powder, FeNi metal powder, Fe—Al—Ni metal powder, Fe—Al—P metal powder, Fe—Ni—Si—Al metal powder, Fe—Ni—Si—Al—Mn metal powder, Ni—Co metal powder, Fe—Mn—Zn metal powder, Fe—Ni—Zn metal powder, Fe—Co—Ni—Cr metal powder, Fe—Co—Ni—P metal powder, Co—Ni metal powder and Co—P metal powder. Of them, the preferable is the fine powder of Co-containing $\gamma$-$Fe_2O_3$.

When ferromagnetic metallic powder such as metallic powder of Fe—Al and Fe—Al—Ni is used for the present invention, preferable effects can be provided.

According to the present invention, in order to regulate the magnetic attraction force of ferromagnetic metallic powder, and also in order to prevent sintering of magnetic powder, ferromagnetic powder having water, the amount of which is 0.3 to 20 weight % with respect to the weight of magnetic powder, is preferably provided, wherein the water adheres on the surface of the ferromagnetic powder. More preferably, the amount of water is 0.7 to 1.6 weight % with respect to the weight of magnetic powder.

When the weight of adhered water is in the above range, the dispersion properties of ferromagnetic powder are improved. As a result, the electromagnetic transducing properties and durability of traveling of the magnetic recording medium can be improved.

When the amount of water is less than 0.3 weight %, magnetic powder tends to coagulate due to the high magnetic attraction force of ferromagnetic powder and surface activity. Therefore, the dispersion properties are deteriorated. When the amount of water is not less than 2.0 weight %, the number of active points on the surface of ferromagnetic powder is reduced, so that the adsorption properties of macro molecules of the binder is deteriorated, and the dispersion properties of magnetic powder are lowered.

In order to regulate the water content of ferromagnetic powder so that the water content can be in the above range, the drying condition may be selected in the manufacturing process of ferromagnetic powder.

The specific surface area of the aforementioned ferromagnetic powder measured by the BET method is usually not less than 30 $m^2$/g, and preferably 40 to 80 $m^2$/g.

The configuration of the ferromagnetic powder is not particularly limited, for example, the configuration may be acicular, spherical or spheroidal.

In the present invention, the saturation magnetization amount ($\sigma S$) of ferromagnetic powder is preferably 80 to 200 emu/g, and more preferably 120 to 160 emu/g.

The amount of binder used for the present invention is preferably 10 to 30 weight parts with respect to 100 weight parts of ferromagnetic powder, and more preferably 15 to 25 weight parts.

In the case where the amount of binder is less than 10 weight parts, magnetic powder is separated from the base support, so that the durability of the magnetic recording layer is deteriorated. In the case where the amount of binder is more than 30 weight parts, the dynamic features of the coated film are like macro molecules, and the resilience is enhanced in a high frequency region, however, smoothness of the surface deteriorates, so that the electromagnetic transforming properties and still durability are lowered.

In the present invention, examples of usable binders are: vinyl chloride copolymer and polyurethane resin having negative functional groups.

Examples of the negative functional group are: —$SO_3M^1$, —$OSO_2M^1$, —$OSO_3M^1$, —$COOM_2$, —OH and monovalent —{$(OM^2)(OM^3)$}P=O, and —{$(OM^2)(OM^3)$}P=O, wherein $M^1$ represents a hydrogen atom or alkali metal, and $M^2$ and $M^3$ respectively represent one of hydrogen atom, alkali metal and alkyl group, and wherein $M^2$ and $M^3$ may be different from each other or they may be the same.

Further, one of the examples of the negative functional group is (quat N)$^+$($CH_2$)$_n$$SO_3^-$ (n: 1 to 5). Especially, —$SO_3M^1$ and (quat N)$^+$($CH_2$)$_n$$SO_3^-$ are preferably used.

It is preferable that the negative functional group in the binder is contained by 0.01 to 0.50 mmol/g.

When the amount of negative functional groups is in the above range, the dispersing properties of ferromagnetic powder is improved. As a result, the output of the magnetic recording medium is increased, and further the durability can be improved. When the amount of negative functional groups is not more than 0.01, the dispersing properties can not be sufficiently provided, and when the amount of negative functional groups is not less than 0.5, coagulation occurs in the molecules and coagulation also occurs among the molecules. Therefore, selectivity is required with respect to a solvent.

A molecular weight of a polymer having the negative functional group is usually 2000 to 70000, and preferably 4000 to 50000. When this molecular weight exceeds 70000, the viscosity of magnetic coating exceeds an allowable range, and the object of the present invention may not be accomplished.

On the other hand, in the case where the molecular weight is less than 2000, some portions do not respond in the hardening process conducted by a hardening agent after the magnetic coating has been coated on the nonmagnetic base support. Accordingly, a low molecular weight component remains, and physical properties of the coated film are deteriorated.

In the case where the polymer having the aforementioned negative functional group is used, the composition amount of the polymer is usually 2 to 15 weight parts with respect to 100 weight parts of the ferromagnetic powder, and preferably 3 to 10 weight parts.

According to the present invention, when a hardening agent of polyisocyanate is used together with the polymer having a negative functional group, the durability of the magnetic layer can be improved.

Examples of usable polyisocyanate hardening agents are tolylene diisocyanate, diphenyl methane diisocyanate, and either of hardening agents described on page 9 to 10 of Japanese Patent Publication Open to Public Inspection No. 113820/1991. Usable hardening agents described on pages 9–10 of JP 1138020/1991 include, di-functional isocyanate including tolylenediisocyanate, diphenylmethanediisocyanate and hexanediisocyanante, tri-functional isocyanate including Coronate L (the product name: produced by Japan Polyurethane Industry Co., Ltd.) and Dess Module (the product name: produced by Bayer), those conventionally used as a hardener such as urethane prepolymer containing an isocyanate group at both ends and polyisocyanate usable as a hardener.

An amount of the hardening agent to be used is usually 5 to 80 weight parts of all the amount of binder.

According to the present invention, a copolymer of vinyl chloride having a negative functional group and polyurethane are used as binder, and also thermoplastic resin conventionally used for a magnetic recording medium, reaction type resin, electron beam irradiation hardening type resin and a mixture of these resins can be used.

Usable examples of the thermoplastic resins are: a copolymer of vinylchloride-vinyl acetate, and one of the resins described on page 10 to 11 of Japanese Patent Publication No. 113820/1991.

These resins may be used alone. Alternatively, not less than two resins may be combined so as to be used.

Usable examples of the thermoplastic resins or the reaction type resins are: phenol resin, epoxy resin, and resins described on page 11 of Japanese Patent Publication Open to Public Inspection No. 113820/1991. The thermoplastic resins described on pages 10–11 and on page 11 of JP 1138020/1991 include, for example, a vinyl chloride —vinyl acetate copolymer, a vinyl chloride-vinylidene chloride copolymer, a vinyl chloride-acrylonitrile copolymer, an ester acrylic acid-acrylonitrile copolymer, acrylic acid ester-vinylidene chloride copolymer, methacrylic acid ester-vinylidene chloride copolymer, methacrylic acid ester-ethylene copolymer, vinyl polyfluoride, a vinylidene chloride-acryliro nitrile copolymer, an acrylonitrile-butadiene copolymer, polyamide resin, polyvinyl butylal, cellulose derivatives (cellulose acetate butyrate, cellulose diacetate, cellulose triacetate, cellulose propionate and nitro cellulose), a styrene butadiene copolymer, a polyester resin, a chlorovinylether - ester acrylic acid copolymer, an amino resin and synthetic rubber type thermoplastic resin.

As the above-mentioned thermo-hardening resin or a reactive type resin, for example, a phenol resin, an epoxy resin, a polyurethane-hardening resin, a urea resin, a melamine resin, an alkyd resin, a silicone resin, an acrylic reaction resin, a mixture of a polyester resin with high molecular weight and an isocyanate prepolymer, a mixture of a methacrylate copolymer and a diisocyanate prepolymer, a formaldehyde urea resin and a polyamide resin are described.

These resins may be used alone. Alternatively, not less than two resins may be combined so as to be used.

Usable examples of the electron beam irradiation hardening type resin are: resin of maleic anhydride type, resin of urethane acrylic type, and resins described on page 12 of Japanese Patent Publication Open to Public Inspection No. 113820/1991. Irradiation hardening resins described on page 12 of JP 113820/1991 include unsaturated prepolymers of various types such as a maleic acid anhydride type, urethane acryl type, epoxy acryl type, polyester acryl type, polyether acryl type, polyurethane acryl type and polyamide acryl type; and poly-functional monomers of various types such as an ether acryl type, a urethane acryl type, an epoxyacryl type, an ester phosphoric acid acryl type, an aryl type and a hydrocarbon type.

These resins may be used alone. Alternatively, not less than two resins may be combined so as to be used.

The composition ratio of polyurethane and vinyl chloride copolymer is the same as the weight ratio of polyurethane (PU) resin and vinyl chloride copolymer. Usually, the weight ratio is 9:1 to 1; 9, and preferably 8:2 to 2:8. In the case where this composition ratio is out of the range, the electromagnetic transducing characteristics of the magnetic layer the magnetic recording medium of the present invention is deteriorated, and further the dispersion properties of ferromagnetic powder are lowered.

Examples of the dispersing agent which is an optional component in the present invention are: lecithin, fatty acid, and dispersing agents described in Japanese Patent Publication Open to Public Inspection No. 113820/19991. These dispersing agents may be added to the magnetic layer. These resins may be used alone. Alternatively, not less than two resins may be combined so as to be used. The dispersing agents described in JP 113820/1991 include lecithin, fatty acid, amine compound, alkyl sulfate, fatty acid amide, higher alcohol, polyethylene oxide, sulfosuccinic acid, sulfosuccinic acid ester, conventional surfactants and their salt, anion organic groups (for example, —COOH and —$PO^2H$) and the salt of polymer dispersing agents.

According to the present invention, as described before, specific binder and ferromagnetic powder are used. Therefore, an addition amount of the dispersing agent can be minimized. That is, with respect to 100 weight parts of ferromagnetic powder, the addition amount of the dispersing agent is usually not more than 10 weight parts, and preferably not more than 3 weight parts.

In the present invention, fatty acid ester may be added. Examples of usable ester are: butyl stearate, butyl palmitate, and fatty acid ester described in Japanese Patent Publication Open to Public Inspection No. 113820/1991. In this case, butyl stearate and butyl palmitate are preferably used. The fatty acid esters described in JP 113820/1991 include oleyloleate, oleylstearate, isocetylstearate, dioleylmaleate, butylstearate, butylpalmitate, butylmyristate, octylmyristate, octylpalmitate, amylstearate, amylpalmitate, stearylstearate, laurylaurate, octylaurate, isobutylaurate, ethylaurate, isotridecylaurate, 2-ethylhexylstearate, 2-ethylhexylmyristate, ethylstearate, 2-ethylhexylpalmitate, isopropylpalmitate, isopropylmyristate, butyllaurate, cetyl-2-ethylhexalate, dioleyladipate, diethyladipate, diisobutyladipate and diisodecyladipate.

These fatty acid esters may be used alone. Alternatively, not less than two esters may be mixed so as to be used.

In the present invention, as described before, selected binder and ferromagnetic powder are used. Accordingly, the addition amount of fatty acid ester can be minimized. With respect to 100 weight parts of ferromagnetic powder, the composition ratio of fatty acid ester may be usually 0.5 to 10 weight parts, and preferably 1 to 5 weight parts.

When an addition amount of dispersing agent such as fatty acid and that of plasticizer such as fatty acid ester are reduced, the durability of traveling of the magnetic recording medium can be improved under the condition of high temperature and moisture.

The magnetic layer of the magnetic recording medium of the present invention may contain a lubricating agent.

When fatty acid and/or fatty acid ester are contained as a lubricating agent, the characteristics of both fatty acid and fatty acid ester are exhibited, so that the defects caused when one of them is used alone are canceled, and further the lubricating effect can be improved. As a result, the still image durability, traveling stability and S/N ratio can be improved. In this case, the preferable addition amount of fatty acid is 0.2 to 10 weight parts with respect to 100 weight parts of magnetic powder. More preferably, the addition amount of fatty acid is 0.5 to 8 weight parts. When the amount of fatty acid is out of the range, for example, when the amount of fatty acid is too small out of the range, the dispersion properties of magnetic powder are lowered, and the traveling properties of the magnetic recording medium is also lowered. When the amount of fatty acid is too large out of the range, fatty acid oozes out, and the output is lowered. It is preferable that the addition amount of fatty acid ester is 0.1 to 10 weight parts with respect to 100 weight parts of magnetic powder. More preferably, the addition amount of fatty acid ester is 0.2 to 8.5 weight parts. When the amount is too small out of the range, the traveling properties can not be improved, and the amount is too large out of the range, the output is lowered.

In order to enhance the above effects, it is preferable that a weight ratio of fatty acid to fatty acid ester is 10/90 to 90/10, that is, fatty acid/fatty acid ester=10/90 to 90/10. In this connection, fatty acid provides dispersing effects. Therefore, when fatty acid is used, an amount of use of another dispersing agent of low molecular weight is reduced so that the Young's modulus of the magnetic recording medium can be improved.

Fatty acid may be either monobasic or dibasic. The number of atoms of fatty acid is preferably 6 to 30, and more preferably 12 to 22. Examples of usable fatty acid are: myristic acid, stearic acid and fatty acid described on pages 130 to 131 of Japanese Patent Publication Open to Public Inspection No. 110818/1990. The fatty acids of JP 110818/1990 are (1) caproic acid
(2) caprylic acid
(3) capric acid
(4) lauric acid
(5) myristic acid
(6) palmitic acid
(7) stearic acid
(8) isostearic acid
(9) linolenic acid
(10) linoleic acid
(11) oleic acid
(12) elaidic acid
(13) behenic acid
(14) malonic acid
(15) succinic acid
(16) maleic acid
(17) glutaric acid
(18) adipic acid
(19) pimelic acid
(20) azelaic acid
(21) sebacic acid
(22) 1,12-dodecanedicarboxylic acid, and
(23) octanedicarboxylic acid.

Examples of usable fatty acid ester are: butyl stearate, butyl palmitate, and fatty acid ester described on page 181 of Japanese Patent Publication Open to Public inspection No. 110818/1991. The fatty acid esters include:

(1) Oleyloleate
(2) Oleylstearate
(3) Isocetylstearate
(4) Dioleylmaleate
(5) Butylstearate
(6) Butylpalmitate
(7) Butylmyristate
(8) Octylmyristate
(9) Octylpalmitate
(10) Amylstearate
(11) Amylpalmitate
(12) Isobutyloleate
(13) Stearylstearate
(14) Lauryloleate
(15) Octyloleate
(16) Isobutyloleate
(17) Ethyloleate
(18) Isotridecyloleate
(19) 2-ethylhexylstearate
(20) 2-ethylhexylmyristate
(21) Ethylstearate
(22) 2-ethylhexylpalmitate
(23) Isopropylpalmitate
(24) Isopropylmyristate
(25) Butyllaurate
(26) Cetyl-2-ethylhexalate
(27) Dioleyladipate
(28) Diethyladipate
(29) Diisobutyladipate, and
(30) Diisodecyladipate.

Not only the fatty acid and fatty acid ester described above but also the following may be added to the magnetic layer: other lubricating agents (for example, silicon oil; denatured carboxylic acid and denatured ester), graphite, carbon fluoride, molybdenum disulfide, tungsten disulfide, fatty acid amide, and α-olefin oxide.

A composition ratio of the lubricating agent is usually not more than 20 weight parts with respect to 100 weight parts of ferromagnetic powder, and preferably not more than 10 weight parts. When this composition ratio exceeds 20 weight parts, the amount of lubricating agent becomes excessive, so that a surface of the magnetic layer tends to be stained.

The magnetic layer may include abrasive material and antistatic additives.

Examples of usable abrasive material are: α-alumina, chromium oxide, and abrasive material described on page 131 of Japanese Patent Publication Open to Public Inspection No. 110818/1990. These abrasive materials include non-magnetic abrasive particles such as α-alumina, chromium oxide, titanium oxide, α-iron oxide, silicon oxide, silicon nitride, silicon carbide, zirconium oxide, zinc oxide, cerium oxide, magnesium oxide and boron nitride. The average particle size of this abrasive material is preferably 0.6 μm or less. In addition, the Mohs hardness is preferably 5 or more.

Also included are anti-static agents such as graphite, dispersing agents such as powdered lecithin and phosphoric acid ester. In addition, carbon black can be used in combination.

It is more preferable that a range of the average particle size of a non-magnetic particles incorporated in a back-coating layer is from 10 mμ to 1000 mμ. The reason for this is that, when the average particle size is within the above-mentioned range, non-magnetic particles are not too small, resulting in favorable addition effects.

As a non-magnetic particle, there are cited those of silicone oxide, titanium oxide, aluminum oxide, chromium oxide, silicon carbide, calcium carbide, zinc oxide, $\alpha Fe_2O_3$, talc, china clay, calcium sulfate, boron nitride, zinc fluoride, molybdenum dioxide, calcium carbide and barium sulfate. In addition to these, organic powder such as a benzoguanamine type resin, a melamine type resin, a phthalocyanine type pigment can be used. An organic powder and the above-mentioned inorganic powder can be used in combination.

When carbon black is jointly added, the traveling properties and electromagnetic transducing properties can be improved, and further the dispersion properties are a little improved, and also the residual solvent amount in the magnetic layer is reduced, so that electrostatic charging can be effectively prevented.

When carbon black for use in light shielding is employed, the effect of light shielding can be enhanced. An example of usable carbon black for use in light shielding is: carbon black such as Raven 2000 manufactured by Colombia Carbon Co. (the specific surface area is 190 $m^2/g$, and the particle size is 18 μm), which is described on page 129 of Japanese Patent Publication Open to Public Inspection No. 110818/1990.

Examples of usable conductive carbon black are: carbon black described on page 129 of Japanese Patent Publication Open to Public Inspection No. 110818/1990 such as Conductex 975 (BET value: 250 $m^2/g$, DBP oil absorption amount: 170 ml/100 gr, particle size: 24 mμ), and Conductex 900 (BET value: 125 $m^2/g$, particle size: 27 mμ) manufactured by Columbia Carbon Co.

Examples of usable carbon black in the present invention are: Conductex-SC (BET 220 $m^2/g$, DBP 115 ml/100 g, particle size 20 mμ) manufactured by Columbia Carbon Co., and Vulcan 9 (BET 140 $m^2/g$, DBP 114 ml/100 g, particle size 19 mµ), which are described on page 129 to 130 in Japanese Patent Publication Open to Public inspection No. 110818/1990.

Examples of usable carbon black described on pages 129 to 130 of JP 110818/1990, are as follows:

As the above-mentioned carbon black, when using a carbon black for light-shielding use, it is possible to enhance the degree of light-shielding. For the carbon black for light-shielding, Raven 2000 (specific surface area is 190 $m^2/g$ and the grain size is 18 mµ), 2100, 1170 and 1000 each produced by Colombia carbon Co., Ltd. and #100, #75, #40, #35 and #30 produced by Mitsubishi Kasei Co., Ltd., for example, can be used.

In addition, as an electroconductive carbon black, for example, Conductex 975 produced by Columbia Carbon Co., Ltd. (BET value (hereinafter abbreviated as BET) of $250 m^2/g$ and DBP oil-absorption amount (hereinafter abbreviated as DBP) of 170 ml/100 gr and the grain size is 24 mµ), Conductex 900 (BET of 125 $m^2/g$ and the grain size is 27 mµ), Conductex 40-220 (the grain size is 20 mµ), Conductex SC (BET of 220 $m^2/gr$ and DBP of 115 ml/100 gr and the grain size of 20 mµ), Cabot Vulcan XC-72 produced by Cabot Corp. (the specific surface area is 254 $m^2/g$ and the grain size is 30 mµ), Vulcan P (BET of 143 $m^2/gr$, DBP of 118 ml/100 gr. and the grain size of 20 mµ), Raven 1040 and 420, Black Pearls 2000 (the grain size of 15 mµ) and #44 produced by Mitsubishi Kasei Co., Ltd are available.

In addition, as other carbon blacks usable in the present invention, Conductex—SC (BET is 220 $m^2/gr$ DBP of 115 ml/100 g and the grain size of 20 mµ) produced by Columbia Carbon, Vulcan 9 Produced by Cabot (BET is 140 $m^2/g$, DBP is 114 ml/100 g and the grain size is 19 mµ), #80 produced by Asahi carbon (BET is 117 $m^2/g$, DBP is 113 ml/100 g and the grain size is 23 mµ), HS100 produced by Denki Kagaku (BET is 32 $m^2/g$, DBP is 180 ml/100 g and the grain size is 53 mµ) and #22B (BET is 55 $m^2/g$, DBP is 131 ml/100 g and the grain size is 40 mµ), #20B (BET is 56 $m^2/g$, DBP is 115 ml/100 g and the grain size is 40 mµ) and #3500 (BET is 47 $m^2/g$, DBP is 187 ml/100 g and the grain size is 40 mµ) produced by Mitsubishi Kasei, are cited. In addition, CF-9, #4000 and MA-600 produced by Mitsubishi Kasei Co., Ltd., Black Pearl L produced by Cabot Corp., Monarck 800, Black Pearls 700, Black Pearls 1000, Black Pearls 880, Black Pearls 900, Black Pearls 1300, Black pearls 2000, Sterling V, Raven 410 produced by Colombian Carbon, Raven 3200, Raven 430, Raven 450, Raven 825, Raven 1255, Raven 1035, Raven 1000, Raven 5000 and Kechen black FC are cited.

In this connection, the aforesaid antistatic agent and the dispersing agent described later are provided with not less than two functions, for example, one component serves as a lubricating agent and an antistatic agent.

Therefore, the classification of agents described in the present invention shows a primary function. It should be noted that the function is not limit by the classification described above.

Nonmagnetic Base Support

Examples of usable material of a nonmagnetic nonmetallic base support on which a plurality of magnetic layers are laminated are: polyester such as polyethylene terephthalate, and polyethylene-2,6-naphthalate; polyolefin such as polypropylene; cellulose derivative such as cellulose triacetate, and cellulose diacetate; and plastic such as polycarbonate, polyamide, polyamideimide, and polyimide.

Thickness of base support is usually 3 to 100 µm, and preferably 5 to 50 µm.

On the reverse side of the nonmagnetic base support, that is, on the side of the nonmagnetic base support on which the magnetic layer is not coated, a back-coat layer may be provided for the purpose of improving the traveling properties, preventing the electrostatic charge, and preventing transfer.

Also, on the surface of the nonmagnetic base support on which the magnetic layer is coated, an intermediate layer (for example, an adhesive agent layer) may be provided for improving the adhesive properties between the magnetic layer and the nonmagnetic layer.

Next, a method for manufacturing the magnetic recording medium of the present invention will be described as follows.

Manufacturing Method

The magnetic recording medium of the present invention can be manufactured in the following manner: Magnetic layer forming components such as ferromagnetic powder and polyurethane having a negative functional group are kneaded and dispersed in a solvent so that magnetic coating is prepared. Then the magnetic coating is coated and dried on the nonmagnetic base support.

Examples of usable solvents used for kneading and dispersing the magnetic layer forming components are: compounds of ketone type such as acetone, methylethyl ketone (MEK), methylisobutyl ketone (MIBK), and cyclohexanone; and solvents described on pages 18 to 19 in Japanese Patent Publication Open to Public Inspection No. 113820/1991. Solvents described in JP 113820/1991 for kneading and dispersion of a magnetic layer forming component are, for example, ketone types such as acetone, methylethylketone (MEK), methylisobutylketone (MIBK) and cyclohexanone; alcohol types such as methanol, ethanol, propanol and butanol; ester types such as methyl acetate, ethyl acetate, butyl acetate, ethyl laurate, propyl acetate and ethylene glycol monoacetate; ether types such as diethyleneglycoldimethylether, 2-ethoxyethanol, tetrahydrofuran and dioxane; aromatic hydro-carbon types such as benzene, toluene and xylene; and halogenated hydrocarbon types such as methylene chloride, ethylene chloride, carbon tetrachloride, chloroform, ethylenechlorohydrin and dichlorobenzene.

In the case where the magnetic coating components are kneaded, the ferromagnetic powder and other magnetic coating components are concurrently or individually put into a kneader. For example, first, the ferromagnetic powder is added into a solvent containing a dispersing agent, and kneaded for a predetermined period of time, and then the other components are added. After that, kneading is continued so that magnetic coating can be provided.

When the magnetic coating materials are kneaded and dispersed, various kneader can be applied. A two-roller mill and three-roller mill are used for the kneader, and further a kneader described on page 20 of Japanese Patent Publication Open to Public Inspection No. 113820/1991 can be applied.

A coating liquid of the magnetic layer component prepared in the above manner is coated onto a nonmagnetic base support by a method of the prior art.

Examples of usable coating methods are: an extruder coating method, gravure roller coating method, Wirebar coating method, and a coating method described on page 20 of Japanese Patent Publication Open to Public Inspection No. 113820/1991.

The kneader and the coating method described in JP 113820/1991 are as follows:

Various kneaders can be used. As the kneader, for example, a 2-rolls mill, a three-rolls mill, a ball mill, a pebble mill, a side grinder, a Sqegvarl atriter, a high speed impeller dispersing machine, a high speed stone mill, a high speed crushing mill, a disperkneader, a high speed mixer, a homogenizer and a supersonic dispersing machine are cited.

Concerning the thickness of the magnetic layer coated in the aforementioned manner, the dry thickness of the uppermost magnetic layer is 0.1 to 5 μm, and preferably 0.2 to 4 μm. In this case, the total dry thickness of the magnetic layers is usually 1 to 6 μm.

After the magnetic layer forming components have been coated, the magnetic layer is subjected to orientation processing if necessary while it is not dried. Then the magnetic layer is subjected to smoothing processing by means of a super calender roller.

After that, the magnetic recording medium is cut into a predetermined configuration.

EXAMPLE

With reference to an example, the present invention will be specifically described as follows.

Example 1

Magnetic coating was prepared in the following manner: The composition described below was sufficiently stirred and mixed using a ball mill. Then, 5 weight parts of multi-functional isocyanate was added to the mixture. After that, the mixture was filtered by a filter, the average diameter of holes was 1 μm. In this case, all values are expressed by weight parts.

| | |
|---|---|
| Metallic powder of Fe–Al (described in Table 1) | 100 |
| Resin of polyurethane (UR8700 manufactured by Toyo Boseki Co.) | 5 |
| Resin of polyvinyl chloride (MR110 manufactured by Nippon Zeon Co.) | 10 |
| Carbon black | 0.5 |
| α-Al$_2$O$_3$ | 5 |
| Myristic acid | 1 |
| Stearic acid | 1.5 |
| Butyl stearate | 0.5 |
| Butyl palmitate | 0.5 |
| Cyclohexanone | 60 |
| Methyl ethyl ketone | 120 |
| Toluene | 120 |

Next, this coating was applied onto a wide film of polyethylene terephthalate, the thickness of which was 14 μm, and ten dried.

Next, this film was subjected to a super calender roller at a temperature of 70° C under a pressure of 300 kg/cm$^2$. Further, this film was cut into a width of 8 mm. In this way, a magnetic tape was provided. The characteristics of this magnetic tape were measured. The measurement results are shown on Tables 4 and 5.

Examples 2 to 8, and Comparative Examples (1) to (8)

In Examples 2 to 8 and Comparative Examples (1) to (8), the recipes and compositions shown on Tables 1, 2 and 3 were employed, and other conditions were the same as those of the coating of Example 1. The characteristics of obtained magnetic tapes were measured. The measurement results are shown on Tables 4 and 5.

Specific Evaluation

Decrease of RF output ... 100 passes under the condition of 40° C. and RF80%

Difference between the initial RF output and the RF output after 100 passes

Still durability ... Difference between the output for 2 hours under a pause condition, and the RF output Head clog ... An entire 120-minute magnetic recording tape is made to travel repeatedly over 50 passes, and the number of clog of the magnetic tape is counted.

Dropout ... The number of dropouts is counted, in which the dropouts of not less than 10 μm and −16 dB have occurred.

RF output (dB) ... An output value obtained when an inputted signal of 7 MHz is reproduced, is shown with respect to the value of a reference tape.

Angular ratio ... When Hm is 5 KOe, a ratio of residual magnetic flux density/saturation magnetic flux density is measured with a vibrating sample magnetic flux meter manufactured by Toei Kogyo Co.

TABLE 1

| | | Characteristics | | | |
|---|---|---|---|---|---|
| | | Si amount water amount (wt %) | Water amount (wt %) | BET value (m$^2$/g) | Saturation magnetization amount (emu/g) |
| Fe—Al metallic powder | A | 1.22 | 0.8 | 53 | 136 |
| | B | 4.30 | 0.9 | 52 | 136 |
| | C | 4.70 | 1.0 | 51 | 136 |
| | D | 1.30 | 1.1 | 52 | 136 |
| | E | 1.25 | 1.9 | 53 | 136 |
| | F | 1.27 | 2.2 | 52 | 136 |
| | G | 1.21 | 1.1 | 54 | 136 |
| | H | 1.24 | 1.0 | 52 | 120 |
| | I | 1.23 | 1.2 | 51 | 110 |
| α-Fe$_2$O$_3$ | | — | 0.9 | 50 | — |

TABLE 2

| | |
|---|---|
| Polyurethane A | Composed of MDI, 1.4 BG and ADA, and containing —SO$_3$Na by 0.1 mmol/g<br>Molecular weight: 25000 |
| B | Composed of MDI, 1.4 BG and ADA, and containing —SO$_3$Na by 0.01 mmol/g<br>Molecular weight: 25000 |
| C | Composed of MDI, 1.4 BG and ADA, and containing —SO$_3$Na by 0.005 mmol/g<br>Molecular weight: 25000 |
| D | Composed of MDI, 1.4 BG and ADA, and containing —SO$_3$Na by 0.01 mmol/g<br>Molecular weight: 75000 |

MDI (4,4'-diphenylmethane)
1.4 BG (1,4-butanediol)
ADA (adipic acid)

TABLE 3

| | | Example | | | | | | | | | Comparative example | | | | | | | |
|---|---|---|---|---|---|---|---|---|---|---|---|---|---|---|---|---|---|
| | | 1 | 2 | 3 | 4 | 5 | 6 | 7 | 8 | 1 | 2 | 3 | 4 | 5 | 6 | 7 | 8 |
| Fe—Al | A | 100 | — | — | — | — | — | 100 | 100 | — | — | — | 100 | 100 | 100 | 100 | 100 |
| metallic | B | — | 100 | — | — | — | — | — | — | — | — | — | — | — | — | — | — |
| powder | C | — | — | — | — | — | — | — | — | 100 | — | — | — | — | — | — | — |
| | D | — | — | 100 | — | — | — | — | — | — | — | — | — | — | — | — | — |
| | E | — | — | — | 100 | — | — | — | — | — | — | — | — | — | — | — | — |
| | F | — | — | — | — | — | — | — | — | — | 100 | — | — | — | — | — | — |
| | G | — | — | — | — | 100 | — | — | — | — | — | — | — | — | — | — | — |
| | H | — | — | — | — | — | 100 | — | — | — | — | — | — | — | — | — | — |
| | I | — | — | — | — | — | — | — | — | — | — | 100 | — | — | — | — | — |
| Poly- | A | 5 | 5 | 5 | 5 | 5 | 5 | — | 7 | 5 | 5 | 5 | — | — | 8 | 5 | 1 |
| urethane | B | — | — | — | — | — | — | 5 | — | — | — | — | — | — | — | — | — |
| | C | — | — | — | — | — | — | — | — | — | — | — | 5 | — | — | — | — |
| | D | — | — | — | — | — | — | — | — | — | — | — | — | 5 | — | — | — |
| Polyvinyl chloride | | 10 | 10 | 10 | 10 | 10 | 10 | 10 | 15 | 10 | 10 | 10 | 10 | 10 | 20 | 1 | 10 |
| Carbon black | | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| α-Al$_2$O$_3$ | | 5 | 5 | 5 | 5 | 5 | 5 | 5 | 5 | 5 | 5 | 5 | 5 | 5 | 5 | 5 | 5 |
| Myristic acid | | 1 | 1 | 1 | 1 | 1 | 1 | 1 | 1 | 1 | 1 | 1 | 1 | 1 | 1 | 1 | 1 |
| Stearic acid | | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 | 1.5 |
| Butyl stearate | | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Butyl palmitate | | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 | 0.5 |
| Cyclohexanone | | 50 | 50 | 50 | 50 | 50 | 50 | 50 | 50 | 50 | 50 | 50 | 50 | 50 | 50 | 50 | 50 |
| Methyl ethyl ketone | | 200 | 200 | 200 | 200 | 200 | 200 | 200 | 200 | 200 | 200 | 200 | 200 | 200 | 200 | 200 | 200 |
| Toluene | | 100 | 100 | 100 | 100 | 100 | 100 | 100 | 100 | 100 | 100 | 100 | 100 | 100 | 100 | 100 | 100 |
| Remark | | | | | | | | | | | Different powder | | | PU | | B/P | Composition ratio | |

B/P; weight ratio of binder/magnetic powder

TABLE 4

| | | Characteristics | | | | | |
|---|---|---|---|---|---|---|---|
| Sample | | Decrease of RF (dB) | Still durability (dB) | Head clog (times) | Dropout (pieces) | RF output (dB) | Angular ratio |
| Examples | 1 | −0.5 | −0.6 | 0 | 2 | +0.5 | 0.83 |
| | 2 | −1.7 | −1.8 | 0 | 6 | +0.3 | 0.85 |
| | 3 | −0.5 | −0.4 | 0 | 1 | +0.7 | 0.85 |
| | 4 | −1.6 | −1.5 | 0 | 4 | +0.2 | 0.84 |
| | 5 | −0.6 | −0.5 | 0 | 3 | +1.0 | 0.85 |
| | 6 | −2.0 | −1.9 | 0 | 7 | +0.7 | 0.86 |
| | 7 | −2.2 | −2.0 | 0 | 8 | +0.7 | 0.85 |
| | 8 | −2.2 | −2.2 | 0 | 10 | +0.5 | 0.87 |
| Comparative examples | (1) | −3.4 | −3.2 | 1 | 56 | −0.8 | 0.80 |
| | (2) | −3.5 | −3.5 | 1 | 49 | −1.0 | 0.78 |
| | (3) | −3.4 | −3.7 | 2 | 70 | −1.2 | 0.78 |
| | (4) | −3.8 | −3.9 | 2 | 75 | −1.0 | 0.81 |
| | (5) | −3.9 | −3.4 | 1 | 61 | −0.8 | 0.82 |
| | (6) | −3.9 | −3.9 | 3 | 81 | −1.0 | 0.76 |
| | (7) | −4.5 | −4.3 | 6 | 110 | −1.1 | 0.83 |
| | (8) | −4.7 | −4.5 | 8 | 123 | −1.3 | 0.75 |

TABLE 5

| | | Characteristics | |
|---|---|---|---|
| Sample | | $G'_2 (\gamma = 10^{-2}) / G'_1 (\gamma = 10^{-4})$ | $Er_2 (t = 100) / Er_1 (t = 0)$ |
| Example | 1 | 0.65 | 0.67 |
| | 2 | 0.08 | 0.43 |
| | 3 | 0.62 | 0.60 |
| | 4 | 0.09 | 0.38 |
| | 5 | 0.59 | 0.69 |
| | 6 | 0.08 | 0.37 |
| | 7 | 0.07 | 0.47 |
| | 8 | 0.08 | 0.77 |

TABLE 5-continued

| Sample | | $G'_2 (\gamma = 10^{-2})$ / $G'_1 (\gamma = 10^{-4})$ | $Er_2 (t = 100)$ / $Er_1 (t = 0)$ |
|---|---|---|---|
| Comparative | (1) | 0.007 | 0.08 |
| example | (2) | 0.005 | 0.07 |
| | (3) | 0.007 | 0.06 |
| | (4) | 0.009 | 0.06 |
| | (5) | 0.005 | 0.01 |
| | (6) | 0.003 | 0.09 |
| | (7) | 0.0009 | 0.009 |
| | (8) | 0.0008 | 0.006 |

$G'_2 (\gamma = 10^{-2})$ ... Storage modulus at the strain of $10^{-2}$
$G'_1 (\gamma = 10^{-4})$ ... Storage modulus at the strain of $10^{-4}$
$Er_2 (t = 100)$ ... Relaxation modulus after 100 seconds
$Er_1 (t = 0)$ ... Relaxation modulus at 0 second According to the results shown on the above tables, the magnetic recording tapes of the present invention, the physical properties of the coating film of which are determined in accordance with the present invention, are superior to those of the comparative examples in the traveling durability, the physical properties of the coating film of which are not determined in accordance with the present invention.

Examples 9 to 11 and Comparative Examples 11 to 13

Coating recipe of the upper layer

The recipes and compositions shown on Tables 1, 2 and 3 were employed, and other conditions were the same as those of the coating of Example 1. Concerning the lower layer coating, the following recipe and composition were adopted and prepared in the same manner as that of the upper layer coating.

Recipe of the lower layer coating

| | |
|---|---|
| α-Fe$_2$O$_3$ (nonmagnetic hematite) | 100 weight parts |
| Polyurethane A | 5 |
| Polyvinyl chloride | 10 |
| Myristic acid | 1 |
| Butyl palmitate | 0.5 |
| Cyclohexanone | 100 |
| Methyl ethyl ketone | 150 |
| Toluene | 50 |

Then a magnetic recording medium was made in the following manner: The aforementioned lower and upper layer coatings were utilized, and the lower coating was applied on a wide film of polyethylene terephthalate of 14 μm thickness so that a lower layer was formed, and the upper coating was applied on the lower layer so that an upper layer was formed. In this case, the thickness of the lower layer and that of the upper layer were respectively adjusted so that the thickness of the dried layer could be the value shown on Table 1.

After that, in the same manner as that of Example 1, a magnetic recording tape was made, and the characteristics were measured. The results of the measurement are shown on Tables 4 and 5.

Comparative Examples 9 and 10

Concerning the upper layer coating, the recipes and compositions shown on Tables 1, 2 and 3 were adopted. Except for that, a magnetic tape was made in the same manner as that of Example 1. Concerning the lower layer coating, the recipes and compositions shown on Tables 1, 2 and 3 were adopted. Except for that, a magnetic tape was made in the same manner as that of Example 9.

TABLE 6

| | | Example | | | Comparative example | | | | |
|---|---|---|---|---|---|---|---|---|---|
| | | 9 | 10 | 11 | 9 | 10 | 11 | 12 | 13 |
| Fe—Al metallic | A | 100 | — | — | — | 100 | 100 | — | 100 |
| powder | B | — | 100 | — | — | — | — | — | — |
| | C | — | — | — | 100 | — | — | 100 | — |
| | D | — | — | 100 | — | — | — | — | — |
| | E | — | — | — | — | — | — | — | — |
| | F | — | — | — | — | — | — | — | — |
| | G | — | — | — | — | — | — | — | — |
| | H | — | — | — | — | — | — | — | — |
| | I | — | — | — | — | — | — | — | — |
| Polyurethane | A | 5 | — | 5 | 5 | — | 5 | 5 | 8 |
| | B | — | 5 | — | — | — | — | — | — |
| | C | — | — | — | — | 5 | — | — | — |
| | D | — | — | — | — | — | — | — | — |
| Polyvinyl chloride | | 10 | 10 | 10 | 10 | 10 | 10 | 1 | 20 |
| Carbon black | | 0.5 | 0.5 | 0.5 | 0.5 | 0.5 | 0.5 | 0.5 | 0.5 |
| α-Al$_2$O$_3$ | | 5 | 5 | 5 | 5 | 5 | 5 | 5 | 5 |
| Myristic acid | | 1 | 1 | 1 | 1 | 1 | 1 | 1 | 1 |
| Stearic acid | | 1.5 | 1.5 | 1.5 | 1.5 | 1.5 | 1.5 | 1.5 | 1.5 |
| Butyl stearate | | 0.5 | 0.5 | 0.5 | 0.5 | 0.5 | 0.5 | 0.5 | 0.5 |
| Butyl palmitate | | 0.5 | 0.5 | 0.5 | 0.5 | 0.5 | 0.5 | 0.5 | 0.5 |
| Cyclohexanone | | 50 | 50 | 50 | 50 | 50 | 50 | 50 | 50 |
| Methyl ethyl ketone | | 200 | 200 | 200 | 200 | 200 | 200 | 200 | 200 |
| Toluene | | 100 | 100 | 100 | 100 | 100 | 100 | 100 | 100 |
| *Film thickness (ratio of the upper layer) | | 15 | 10 | 5 | 15 | 10 | 30 | 45 | 50 |
| Lower layer Poly-urethane | A | 5 | 5 | 5 | — | — | 5 | 5 | 5 |
| | B | — | — | — | — | — | — | — | — |

TABLE 6-continued

|  |  | Example | | | Comparative example | | | | |
| --- | --- | --- | --- | --- | --- | --- | --- | --- | --- |
|  |  | 9 | 10 | 11 | 9 | 10 | 11 | 12 | 13 |
|  | C | — | — | — | 5 | 5 | — | — | — |
|  | D | — | — | — | — | — | — | — | — |
| Polyvinyl chloride |  | 10 | 10 | 10 | 10 | 1 | 10 | 10 | 10 |

TABLE 7

| Sample | | Characteristics | | | | | |
| --- | --- | --- | --- | --- | --- | --- | --- |
|  |  | Decrease of RF (dB) | Still durability (dB) | Head clog (times) | Dropout (pieces) | RF output (dB) | Angular ratio |
| Examples | 1 | −0.5 | −0.6 | 0 | 2 | +0.5 | 0.83 |
|  | 2 | −1.7 | −1.8 | 0 | 6 | +0.3 | 0.85 |
|  | 3 | −0.5 | −0.4 | 0 | 1 | +0.7 | 0.85 |
|  | 4 | −1.6 | −1.5 | 0 | 4 | +0.2 | 0.84 |
|  | 5 | −0.6 | −0.5 | 0 | 3 | +1.0 | 0.85 |
|  | 6 | −2.0 | −1.9 | 0 | 7 | +0.7 | 0.86 |
|  | 7 | −2.2 | −2.0 | 0 | 8 | +0.7 | 0.85 |
|  | 8 | −2.2 | −2.2 | 0 | 10 | +0.5 | 0.87 |
| Comparative examples | (1) | −3.4 | −3.2) | 1 | 56 | −0.8 | 0.80 |
|  | (2) | −3.5 | −3.5 | 1 | 49 | −1.0 | 0.78 |
|  | (3) | −3.4 | −3.7 | 2 | 70 | −1.2 | 0.78 |
|  | (4) | −3.8 | −3.9 | 2 | 75 | −1.0 | 0.81 |
|  | (5) | −3.9 | −3.4 | 1 | 61 | −0.8 | 0.82 |
|  | (6) | −3.9 | −3.9 | 3 | 81 | −1.0 | 0.76 |
|  | (7) | −4.5 | −4.3 | 6 | 110 | −1.1 | 0.83 |
|  | (8) | −4.7 | −4.5 | 8 | 123 | −1.3 | 0.75 |
| Examples | 9 | −0.4 | −0.3 | 0 | 4 | +1.6 | 0.86 |
|  | 10 | −1.2 | −1.5 | 0 | 3 | +1.8 | 0.88 |
|  | 11 | −0.6 | −0.5 | 0 | 5 | +2.0 | 0.88 |
| Comparative examples | 9 | −3.3 | −3.5 | 2 | 10 | +1.6 | 0.85 |
|  | 10 | −4.0 | −4.1 | 2 | 15 | +1.7 | 0.82 |
|  | 11 | −3.2 | −3.3 | 10 | 50 | +0.8 | 0.72 |
|  | 12 | −3.8 | −3.5 | 12 | 58 | +0.7 | 0.71 |
|  | 13 | −3.6 | −3.3 | 15 | 102 | +0.5 | 0.70 |

TABLE 8

| Sample | | Characteristics | |
| --- | --- | --- | --- |
|  |  | $\dfrac{G'_2 (\gamma = 10^{-2})}{G'_1 (\gamma = 10^{-4})}$ | $\dfrac{Er_2 (t = 100)}{Er_1 (t = 0)}$ |
| Example | 9 | 0.63 | 0.65 |
|  | 10 | 0.10 | 0.48 |
|  | 11 | 0.52 | 0.48 |
| Comparative example | 9 | 0.004 | 0.05 |
|  | 10 | 0.005 | 0.04 |
|  | 11 | 0.008 | 0.06 |
|  | 12 | 0.0008 | 0.009 |
|  | 13 | 0.007 | 0.07 |

$G'_2 (\gamma = 10^{-2})$ ... Storage modulus at the strain of $10^{-2}$
$G'_1 (\gamma = 10^{-4})$ ... Storage modulus at the strain of $10^{-4}$
$Er_2 (t = 100)$ ... Relaxation modulus after 100 seconds
$Er_1 (t = 0)$ ... Relaxation modulus at 0 second According to the results shown on the above tables, the magnetic recording tapes of the present invention, the physical properties of the coating film of which are determined in accordance with the present invention, are superior to those of the comparative examples in the traveling durability, the physical properties of the coating film of which are not determined in accordance with the present invention.

What is claimed is:

1. A magnetic recording medium comprising a nonmetallic base support and a magnetic layer, said magnetic layer containing ferromagnetic metallic powder dispersed in a binder, wherein said magnetic layer has a dry thickness of 0.1 to 5 μm;
said ferromagnetic metallic powder is Fe—Al metallic powder or Fe—Al—Ni powder, wherein said ferromagnetic metallic powder contains water in an amount of 0.3 to 2.0% by weight;
the amount of said binder present is 10 to 30 weight parts with respect to 100 parts of Fe—Al metallic powder or Fe—Al—Ni metallic powder;
said binder contains a binder having a negative functional group, wherein said binder having a negative functional group used in an amount of 2 to 15 weight parts with respect to 100 parts of Fe—Al metallic powder or Fe—Al—Ni metallic powder, wherein said negative functional group is present from 0.01 to 0.50 mmol/g in said binder having a negative functional group; and
said magnetic recording medium has a ratio $G'_2/G'_1$ of not less than 0.01, wherein $G'_1$ is a storage modulus when the strain is $10^{-4}$ and $G'_2$ is a storage modulus when the strain is $10^{-2}$.

2. The magnetic recording medium of claim 1, wherein said magnetic recording medium further comprises at least one nonmagnetic layer in which nonmagnetic powder is dispersed in a binder, and the uppermost layer of said magnetic recording medium is a magnetic layer in which ferromagnetic metallic powder is dispersed in a binder, wherein the thickness of said uppermost layer is not more than 15% of the entire thickness of all layers provided on said nonmetallic base support.

3. The magnetic recording medium of claim 1, wherein said ratio $G'_2/G'_1$ is not less than 0.03.

4. The magnetic recording medium of claim 1, wherein said ferromagnetic metallic powder contains water, and the amount of said water is 0.7 to 1.6% by weight of said magnetic powder.

5. The magnetic recording medium of claim 1, wherein the specific surface area of said ferromagnetic metallic powder is not less than 30 m$^2$/g.

6. The magnetic recording medium of claim 1, wherein the saturation magnetization amount of said ferromagnetic metallic powder is within the range of 80 to 200 emu/g.

7. The magnetic recording medium of claim 1, wherein said binder is vinyl chloride copolymer having a negative functional group selected from the group consisting of —SO$_3$M$^1$, —OSO$_2$M$^1$, —OSO$_3$M$^1$, —COOM$_2$, —OH, —{(OM$^2$)(OM$^3$)}P=O, —O{(OM$^2$)(OM$^3$)}P=O and (quaternary N$^+$)(CH$_2$)$_n$SO—, wherein M$^1$ represents a hydrogen atom or alkali metal, M$^2$ and M$^3$ respectively represent one of hydrogen atom, alkali metal and alkyl group, and n is an integer of 1 to 5.

8. The magnetic recording medium of claim 1, wherein said binder having a negative functional group is vinylchloride copolymer having a negative functional group or a polyurethane copolymer having a negative functional group.

9. The magnetic recording medium of claim 8, wherein the molecular weight average of the vinyl chloride copolymer of the polyurethane copolymer is limited to 2,000 to 70,000.

10. A magnetic recording medium comprising a nonmetallic base support and a magnetic layer having a dry thickness of 0.1 to 5 microns and containing ferromagnetic metallic powder dispersed in a binder, said binder used in amount of 10 to 30 parts by weight per 100 parts ferromagnetic powder, said ferromagnetic powder is Fe—Al metallic powder or Fe—Al—Ni metallic powder, wherein said ferromagnetic metallic powder contains water in an amount of 0.3 to 2.0% by weight, said binder contains a binder having a negative functional group, wherein said binder having a negative functional group, is used in an amount of 2 to 15 weight parts with respect of 100 parts of Fe—Al metallic powder or Fe—Al—Ni metallic powder, and said magnetic recording medium has a relaxation modulus ratio Er$_2$/Er$_1$ of not less than 0.1, wherein Er$_1$ is a relaxation modulus at a point of time of 0 seconds after said magnetic recording medium receives a deformation strain, and Er$_2$ is a relaxation modulus 100 seconds after said magnetic recording medium receives said deformation strain.

11. The magnetic recording medium of claim 10, wherein said magnetic recording medium further comprises at least one nonmagnetic layer in which nonmagnetic powder is dispersed in a binder, and the uppermost layer of said magnetic recording medium is a magnetic layer in which ferromagnetic metallic powder is dispersed in a binder, wherein the thickness of the uppermost layer is not more than 15% of to the entire thickness of all layers provided on said nonmagnetic base support.

12. The magnetic recording medium of claim 10, wherein said ratio Er$_2$/Er$_1$ is not less than 0.4.

13. The magnetic recording medium of claim 10, wherein said ferromagnetic metallic powder contains water, and the amount of said water is 0.7 to 1.6% by weight of said magnetic powder.

14. The magnetic recording medium of claim 10, wherein the specific surface area of said ferromagnetic metallic powder is not less than 30 m$^2$/g.

15. The magnetic recording medium of claim 10, wherein the saturation magnetization amount of said ferromagnetic metallic powder is within the range of 80 to 200 emu/g.

16. The magnetic recording medium of claim 10, wherein said negative functional group is selected from the group consisting of —SO$_3$M$^1$, —OSO$_2$M$^1$, —OSO$_3$M$^1$, —COOM$_2$, —OH, —{(OM$^2$)(OM$^3$)}P=O, —O{(OM$^2$)(OM$^3$)}P=O and (quaternary N)$^+$(CH$_2$)$_n$SO$_3^-$, wherein M$^1$ represents a hydrogen atom or alkali metal, and M$^2$ and M$^3$ respectively represent one of hydrogen atom, alkali metal and alkyl group, and n is an integer of 1 to 5.

* * * * *